(12) United States Patent
Gaze et al.

(10) Patent No.: US 11,485,251 B2
(45) Date of Patent: Nov. 1, 2022

(54) VEHICLE-BASED CHARGING SYSTEM FOR ELECTRIC VEHICLES

(71) Applicant: DAIMLER AG, Stuttgart (DE)

(72) Inventors: Jennifer Gaze, San Jose, CA (US); Jason Persin, San Jose, CA (US); Arfan Ahmad, Windsor (CA)

(73) Assignee: MERCEDES-BENZ GROUP AG, Stuttgart (DE)

( * ) Notice: Subject to any disclaimer, the term of this patent is extended or adjusted under 35 U.S.C. 154(b) by 203 days.

(21) Appl. No.: 16/924,392

(22) Filed: Jul. 9, 2020

(65) Prior Publication Data
US 2021/0009006 A1 Jan. 14, 2021

Related U.S. Application Data

(60) Provisional application No. 62/872,166, filed on Jul. 9, 2019.

(51) Int. Cl.
*B60L 58/24* (2019.01)
*H02J 7/34* (2006.01)
(Continued)

(52) U.S. Cl.
CPC ............... *B60L 58/24* (2019.02); *B60K 1/04* (2013.01); *B60L 53/62* (2019.02); *H02J 7/007* (2013.01);
(Continued)

(58) Field of Classification Search
CPC .......... H02J 7/007; H02J 7/0045; H02J 7/342; H02J 2207/20; B60L 58/24; B60L 53/62; B60K 1/04; B60K 2001/005
(Continued)

(56) References Cited

U.S. PATENT DOCUMENTS 9,592,742 B1 3/2017 Sosinov et al.
10,011,181 B2 7/2018 Dudar et al.
(Continued)

FOREIGN PATENT DOCUMENTS

CN 104999921 A 10/2015
CN 106740174 A 5/2017
(Continued)

OTHER PUBLICATIONS

US 10,153,668 B1, 12/2018, Jadidian et al. (withdrawn)
Chargewheel, "Mobile Charging For Everything Electric," http://chargewheel.com/, retrieved Jun. 24, 2020.

*Primary Examiner* — Edward Tso
*Assistant Examiner* — Aaron Piggush
(74) *Attorney, Agent, or Firm* — Patent Portfolio Builders PLLC

(57) ABSTRACT

A vehicle is configured to charge other electric vehicles. The vehicle includes a battery with a number of battery cells, the battery being configured to output direct current at a first voltage. The vehicle also includes a direct current voltage converter configured to convert direct current received from the battery to a second voltage and an electrical connector in electrical communication with the direct current voltage converter, the electrical connector being configured to supply direct current at the second voltage from the direct current voltage converter to an electric vehicle. The vehicle further includes a control system configured to determine a charging voltage of an electric vehicle, and operate the direct current voltage converter to output direct current at a second voltage corresponding to the charging voltage of the electric vehicle, and a thermal management system configured to maintain the battery within a selected temperature range.

20 Claims, 12 Drawing Sheets

(51) Int. Cl.
*H02J 7/00* (2006.01)
*B60L 53/62* (2019.01)
*B60K 1/04* (2019.01)
*B60K 1/00* (2006.01)

(52) U.S. Cl.
CPC ............ *H02J 7/0045* (2013.01); *H02J 7/342* (2020.01); *B60K 2001/005* (2013.01); *H02J 2207/20* (2020.01)

(58) Field of Classification Search
USPC ................................. 320/104, 109, 152, 153
See application file for complete search history.

(56) References Cited

U.S. PATENT DOCUMENTS

| | | | |
|---|---|---|---|
| 10,131,239 | B2 | 11/2018 | Herke et al. |
| 10,333,338 | B2 | 6/2019 | Zenner et al. |
| 10,391,873 | B2 | 8/2019 | Kohnke |
| 10,399,461 | B1 | 9/2019 | Sosinov et al. |
| 10,507,733 | B2 | 12/2019 | Blum et al. |
| 2011/0206951 | A1* | 8/2011 | Ford ................... H01M 10/625 429/50 |
| 2012/0271758 | A1 | 10/2012 | Jammer |
| 2012/0303213 | A1* | 11/2012 | Prosser ................ B60L 53/305 320/107 |
| 2016/0311357 | A1 | 10/2016 | Ortiz et al. |
| 2016/0318370 | A1* | 11/2016 | Rawlinson ......... B60H 1/32281 |
| 2017/0110770 | A1* | 4/2017 | Marcicki ............... B60K 11/02 |
| 2018/0162228 | A1 | 6/2018 | Götz et al. |
| 2018/0281606 | A1 | 10/2018 | Scherer |
| 2019/0016231 | A1* | 1/2019 | Scaringe ............... H01M 10/63 |
| 2019/0105999 | A1 | 4/2019 | Heyne et al. |
| 2019/0106000 | A1 | 4/2019 | Heyne et al. |
| 2019/0106008 | A1 | 4/2019 | Heyne et al. |
| 2019/0118666 | A1 | 4/2019 | Morgenroth |
| 2019/0135125 | A1 | 5/2019 | Sponheimer et al. |
| 2019/0135133 | A1 | 5/2019 | Miller |
| 2019/0210479 | A1 | 7/2019 | Bachmann et al. |
| 2019/0337406 | A1 | 11/2019 | Mingenbach et al. |
| 2020/0031239 | A1 | 1/2020 | Chae et al. |

FOREIGN PATENT DOCUMENTS

| | | |
|---|---|---|
| CN | 206195367 U | 5/2017 |
| DE | 102009028565 A1 | 2/2011 |
| DE | 102010055102 A1 | 8/2011 |
| DE | 102011079430 A1 | 1/2013 |
| DE | 102012214750 A1 | 11/2013 |
| DE | 102013206903 A1 | 10/2014 |
| DE | 102015110023 A1 | 12/2016 |
| DE | 102015214901 A1 | 2/2017 |
| DE | 102016014034 A1 | 5/2017 |
| DE | 102015225789 A1 | 6/2017 |
| DE | 102016217615 A1 | 3/2018 |
| DE | 102017122177 A1 | 3/2018 |
| DE | 102016221829 A1 | 5/2018 |
| DE | 102016123923 A1 | 6/2018 |
| DE | 102017216076 A1 | 10/2018 |
| DE | 102017207926 A1 | 11/2018 |
| DE | 102017210541 A1 | 12/2018 |
| DE | 102017212435 A1 | 1/2019 |
| DE | 112016006780 T5 | 1/2019 |
| DE | 112016006782 T5 | 1/2019 |
| DE | 112016006789 T5 | 1/2019 |
| DE | 112016006820 T5 | 1/2019 |
| DE | 112016006821 T5 | 2/2019 |
| DE | 102017218854 A1 | 4/2019 |
| DE | 102018125958 A1 | 4/2019 |
| DE | 102017219730 A1 | 5/2019 |
| DE | 102017219760 A1 | 5/2019 |
| DE | 102017131109 A1 | 6/2019 |
| DE | 102018201441 A1 | 8/2019 |
| DE | 102018003560 A1 | 11/2019 |
| EP | 3381735 A1 | 10/2018 |
| EP | 3466748 A1 | 4/2019 |
| EP | 3466749 A1 | 4/2019 |
| EP | 3466750 A1 | 4/2019 |
| EP | 3566283 A1 | 11/2019 |
| GB | 2572758 A | 10/2019 |
| KR | 20120084616 A | 7/2012 |
| WO | 2018126393 A1 | 7/2018 |
| WO | 2019128723 A1 | 7/2019 |

\* cited by examiner

VEHICLE-BASED CHARGING SYSTEM FOR ELECTRIC VEHICLES

CROSS-REFERENCE TO RELATED APPLICATIONS

This application claims priority under 35 U.S.C. § 119 to U.S. Provisional Application No. 62/872,166, filed on Jul. 9, 2019, the entire disclosure of which is herein expressly incorporated by reference.

FIELD

The present disclosure pertains to mobile, vehicle-based charging systems for electric vehicles.

BACKGROUND

Many areas do not have electric vehicle charging infrastructure, making it difficult to charge electric vehicles. Electric vehicle charging infrastructure, and particularly high voltage DC charging stations, can also be expensive to install, and can require significant grid upgrades and trenching. Mobile electric vehicle charging systems allow the charging equipment to be brought to the location of the electric vehicle on demand. However, existing mobile electric vehicle charging systems convert direct current supplied by a battery to alternating current which is supplied to the electric vehicle. The system on the electric vehicle must then convert the alternating current received from the mobile charging system back to direct current again to charge the electric vehicle's battery. Such systems provide low energy transfer rates, which increases the time required to charge the electric vehicle, and waste a significant amount of power converting between direct current and alternating current multiple times. Accordingly, there exists a need for improved mobile systems for charging electric vehicles.

SUMMARY OF THE INVENTION

According to an embodiment, there is a vehicle configured to charge other electric vehicles. The vehicle includes a battery with a number of battery cells, the battery being configured to output direct current at a first voltage. The vehicle also includes a direct current voltage converter configured to convert direct current received from the battery to a second voltage and an electrical connector in electrical communication with the direct current voltage converter, the electrical connector being configured to supply direct current at the second voltage from the direct current voltage converter to an electric vehicle. The vehicle further includes a control system configured to determine a charging voltage of an electric vehicle, and operate the direct current voltage converter to output direct current at a second voltage corresponding to the charging voltage of the electric vehicle, and a thermal management system configured to maintain the battery within a selected temperature range.

According to an embodiment, there is a method for charging an electric vehicle using a service vehicle. A charging voltage of the electric vehicle is determined. A direct current voltage converter steps up or steps down the first voltage to a second voltage corresponding to the charging voltage of the electric vehicle. Direct current is supplied at the second voltage to the electric vehicle from the service vehicle to charge the electric vehicle. A thermal management system maintains the battery within a selected temperature range.

DETAILED DESCRIPTION

Certain embodiments of the disclosure pertain to systems and methods for charging an electric vehicle using a vehicle-based, mobile, direct current charging system.

Figure 1:
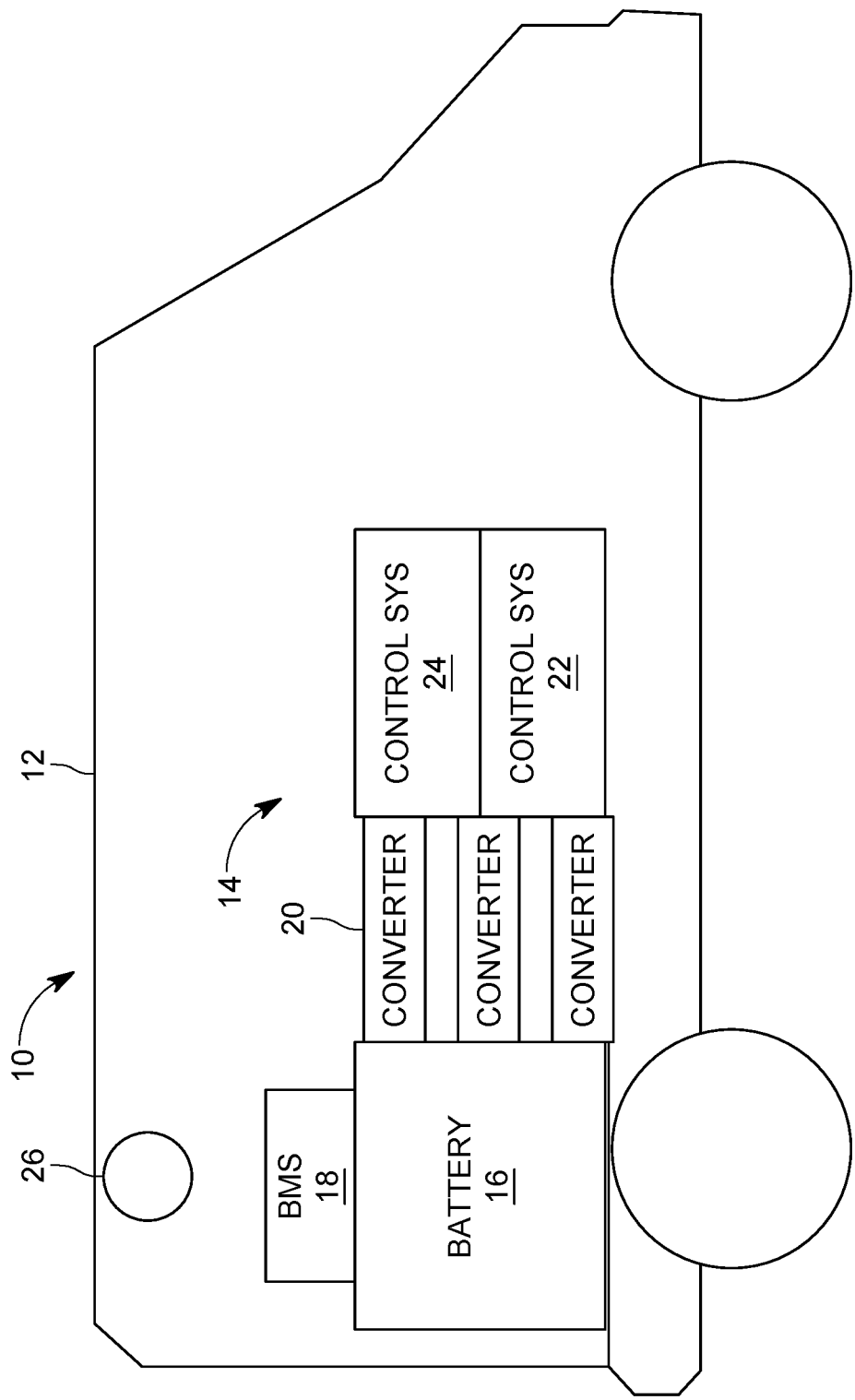
FIG. 1 is a schematic block diagram illustrating an electric vehicle charging system in a vehicle, according to one embodiment.

FIG. 1 illustrates a representative embodiment of a system 10 including a vehicle 12, and an electric vehicle charging system generally indicated at 14 disposed inside the vehicle. As used herein, the term "vehicle" refers generally to any vehicle that has a power source (e.g., motor or engine) or a towable vehicle that is coupled to a driven vehicle for travelling from place to place. A vehicle can include, without limitation, land vehicles such as a car, a truck, a van, a tractor-trailer, a fifth wheel travel trailer, a sport utility recreational vehicle, a motorhome, a military trailer, or a utility trailer, to name a few. A vehicle can also include marine vehicles such as boats or ships, or aircraft. The disclosed electric vehicle charging systems can also be installed in less mobile or permanent structures, such as stationary roadside electric vehicle charging stations, residential, commercial, or government buildings, etc. In the illustrated embodiment, the vehicle 12 (also referred to as a service vehicle) is configured as a van.

The electric vehicle charging system 14 can be configured as a Level 3 "Fast DC" charging system, and can comprise a battery 16 including a plurality of battery cells, a battery management system (BMS) 18, a plurality of DC to DC voltage converters/inverters 20 (also referred to as "DC-DC converters/inverters"), a thermal management system 22, and a control system 24. The electric vehicle charging system 14 can also include a cable management system 26, which can comprise a plurality of cables, electrical connectors (e.g., one or more J1772CCS Type 1 connectors or other connectors) (FIG. 6), etc., to electrically connect the system 14 to an electric vehicle to be charged.

Referring to FIGS. 2 and 3A-3C, the battery 16 may comprise a plurality of modules or compartments 28 including a plurality of individual cells. The modules 28 can be connected in series and/or in parallel, depending upon the particular requirements of the system. The modules can be individually connected and disconnected from the system. In certain embodiments, the battery 16 can comprise a plurality of lithium ion, lithium polymer, nickel-cadmium, nickel metal hydride, lead-acid, or other types of battery packs. In certain embodiments, the battery 16 can have a total capacity of, for example, 50 kW, 100 kW, 200 kW, 300 kW, or more, depending upon the particular configuration. In certain embodiments, the battery 16 can comprise a first voltage or battery voltage, which can be dependent upon the number, type, and arrangement of the cells of the battery. In certain embodiments, the battery voltage can be 1 V to 10,000 V, 10 V to 1,000 V, or 10 V to 500 V.

Figure 3A:
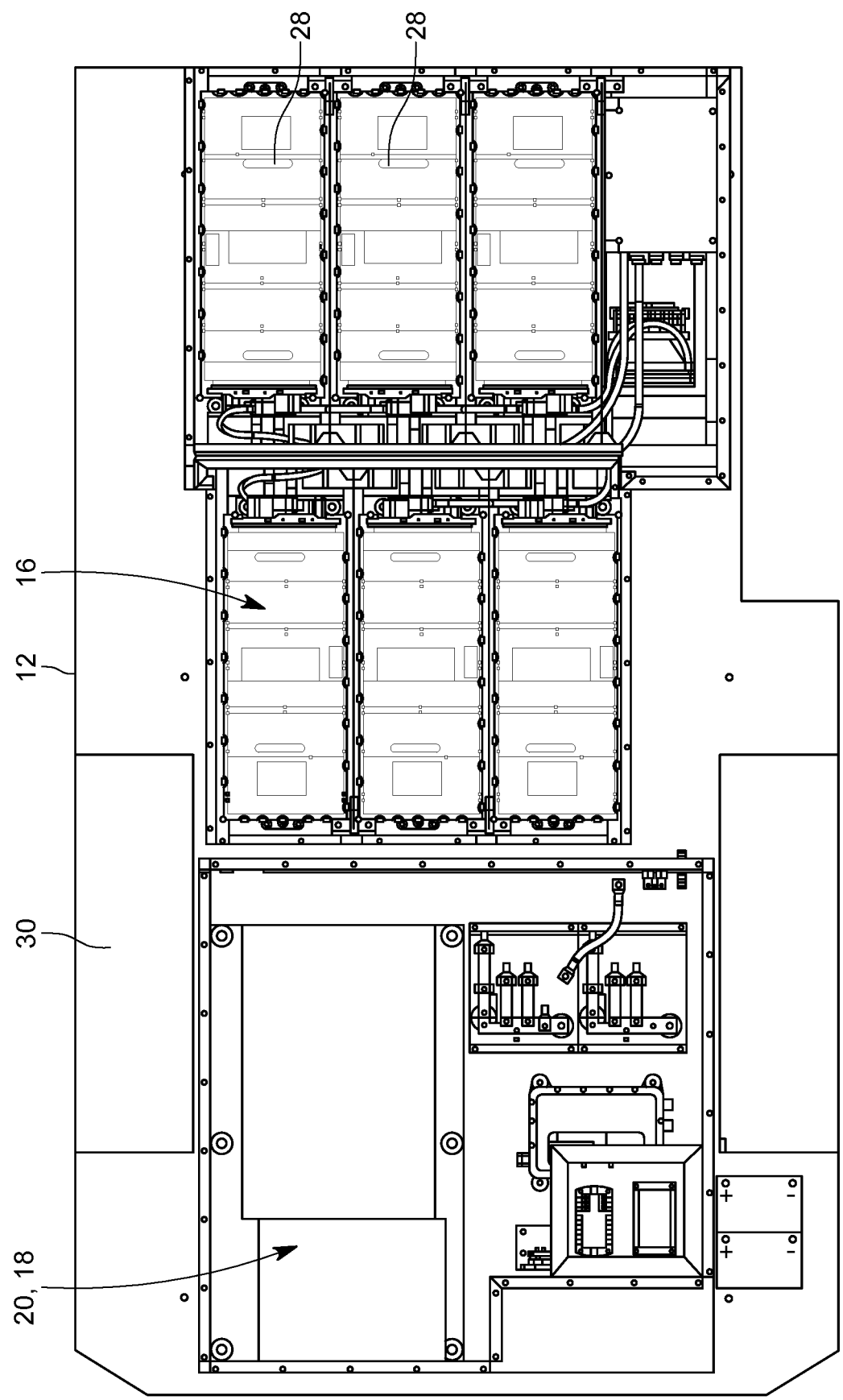
FIG. 3A is a schematic diagram of a top view of a rear floor area of a vehicle with cover panels removed according to embodiments.
Figure 3B:
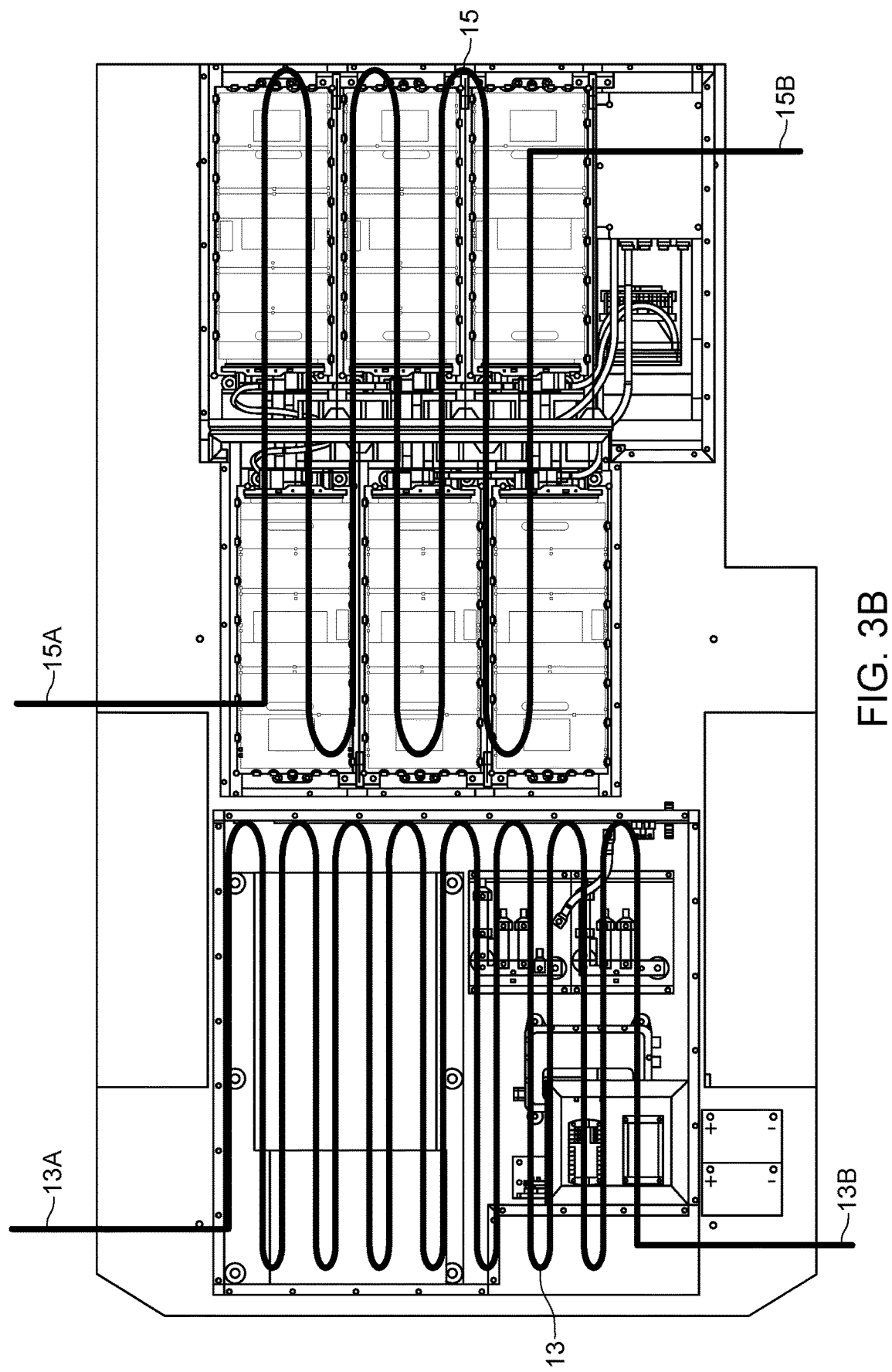
FIG. 3B is a schematic diagram of a top view of a rear floor area of a vehicle with cover panels removed and including portions of the thermal management system according to embodiments.
Figure 7:
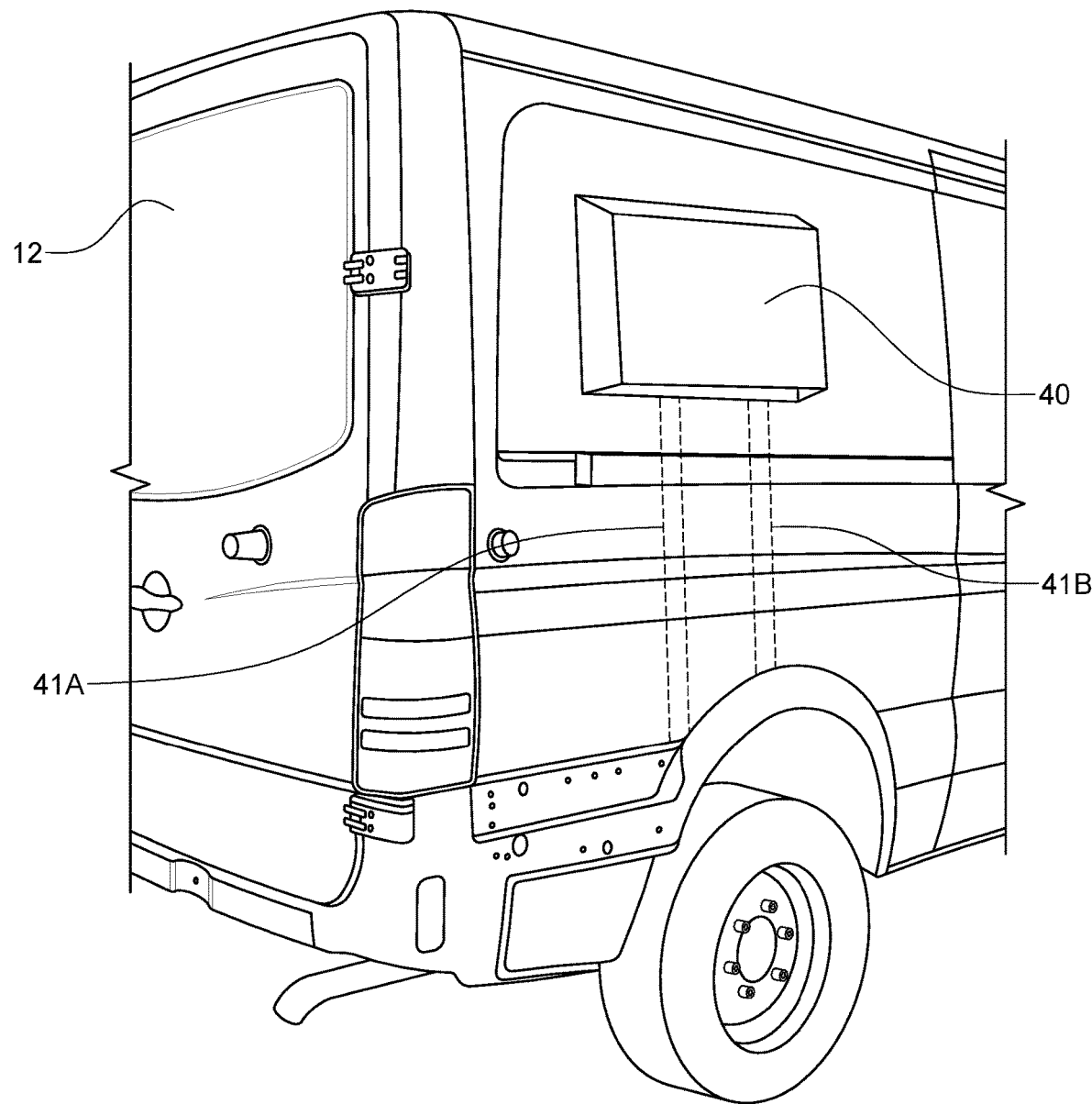
FIG. 7 is a schematic diagram of a perspective view of the rear and one side of a vehicle with an electric charging system according to embodiments.

As illustrated in FIG. 3B, separate conduits 13 and 15 can be provided to control the temperature of the BMS 18 and the DC-DC converters/inverters 20 and the battery 16, respectively. Conduit 13 includes an inlet 13A and outlet 13B, which are fluidically coupled to the thermal management 22. Similarly, conduit 15 includes an inlet 15A and outlet 15B fluidically coupled to the thermal management system 22. In contrast, in the embodiment illustrated in FIG. 3C, a single conduit 17 is arranged to control the temperature of the battery 16, BMS 18, and the DC-DC converters/inverters 20. The conduit 17 includes an inlet 17A and outlet 17B fluidically coupled to the thermal management system 22. The fluidic coupling allows a refrigerant to be passed from the thermal management system 22 over the battery 16, BMS 18, and the DC-DC converters/inverters 20 to draw off heat and then recirculate the refrigerant to the thermal management system 22, which then releases the accumulated heat into the environment outside of the vehicle using a vent 40 (FIG. 7).

Figure 3C:
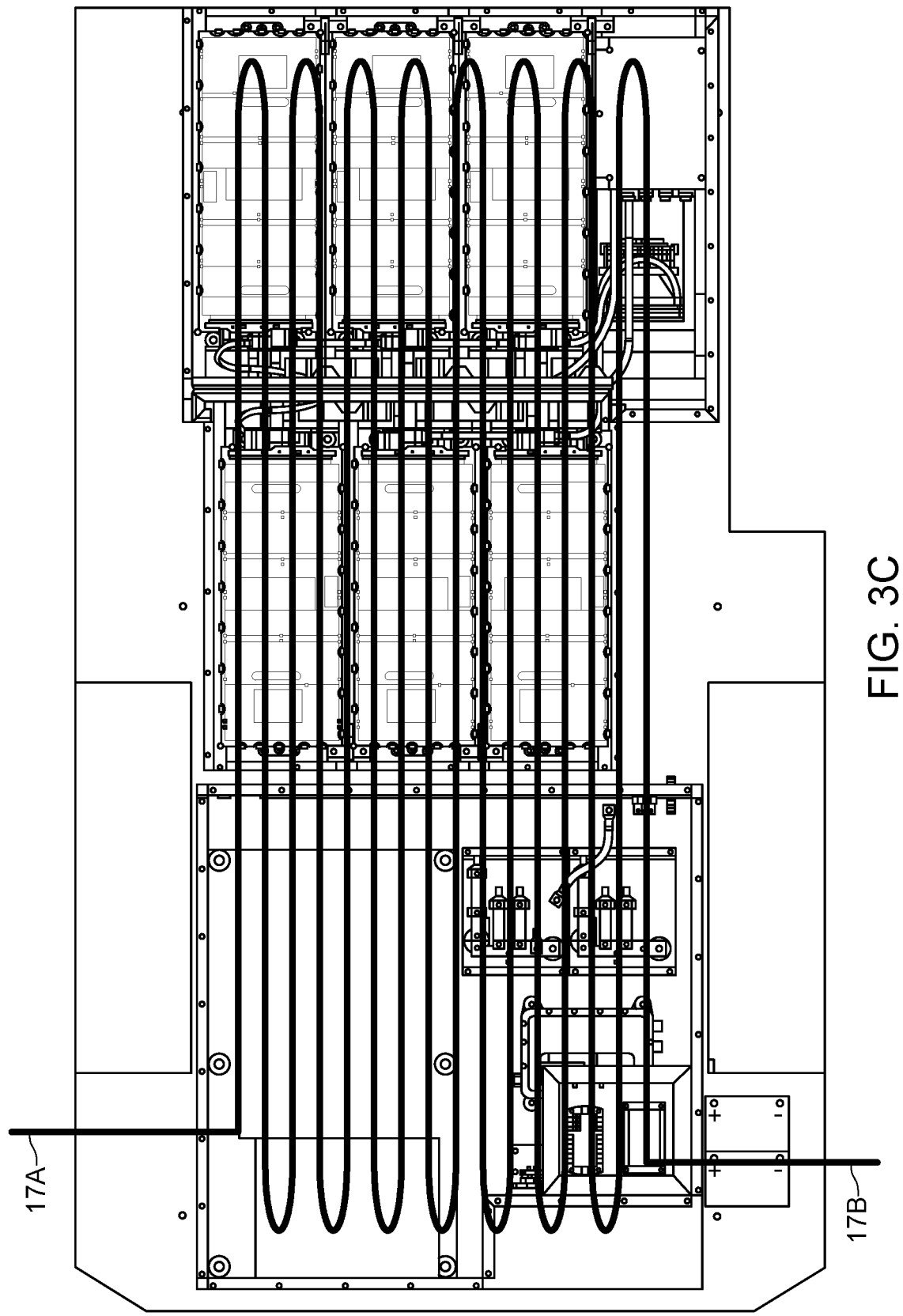
FIG. 3C is a schematic diagram of a top view of a rear floor area of a vehicle with cover panels removed and including portions of the thermal management system according to embodiments.

It should be recognized that the serpentine shape of the conduits in FIGS. 3B and 3C are merely one example of a type of shape for the conduits, and the conduits can be arranged in any other shape. Further, additional heat sinks (not illustrated) can be arranged between the battery 16, BMS 18, and the DC-DC converters/inverters 20 and the conduits or above the conduits. Further, the location of the inlets and outlets illustrated in FIGS. 3B and 3C is just one example of where the inlets and outlets can be located, and those skilled in the art will recognize that the inlets and outlets can be arranged in different locations than what is illustrated in FIGS. 3B and 3C.

The battery management system 18 can provide sensor, data processing, and/or data transfer functionality such as monitoring voltage, temperature, state of charge, health, power, and/or safety, current input and output, and monitoring for faults. The BMS 18 can also use such sensor data to determine charge and discharge current limits, internal impedance of individual battery cells, total energy received and delivered over specified time intervals, number of charge and discharge cycles, etc. In some embodiments, data of such parameters can be provided to a supervisory system controller, as described below.

Figure 2:
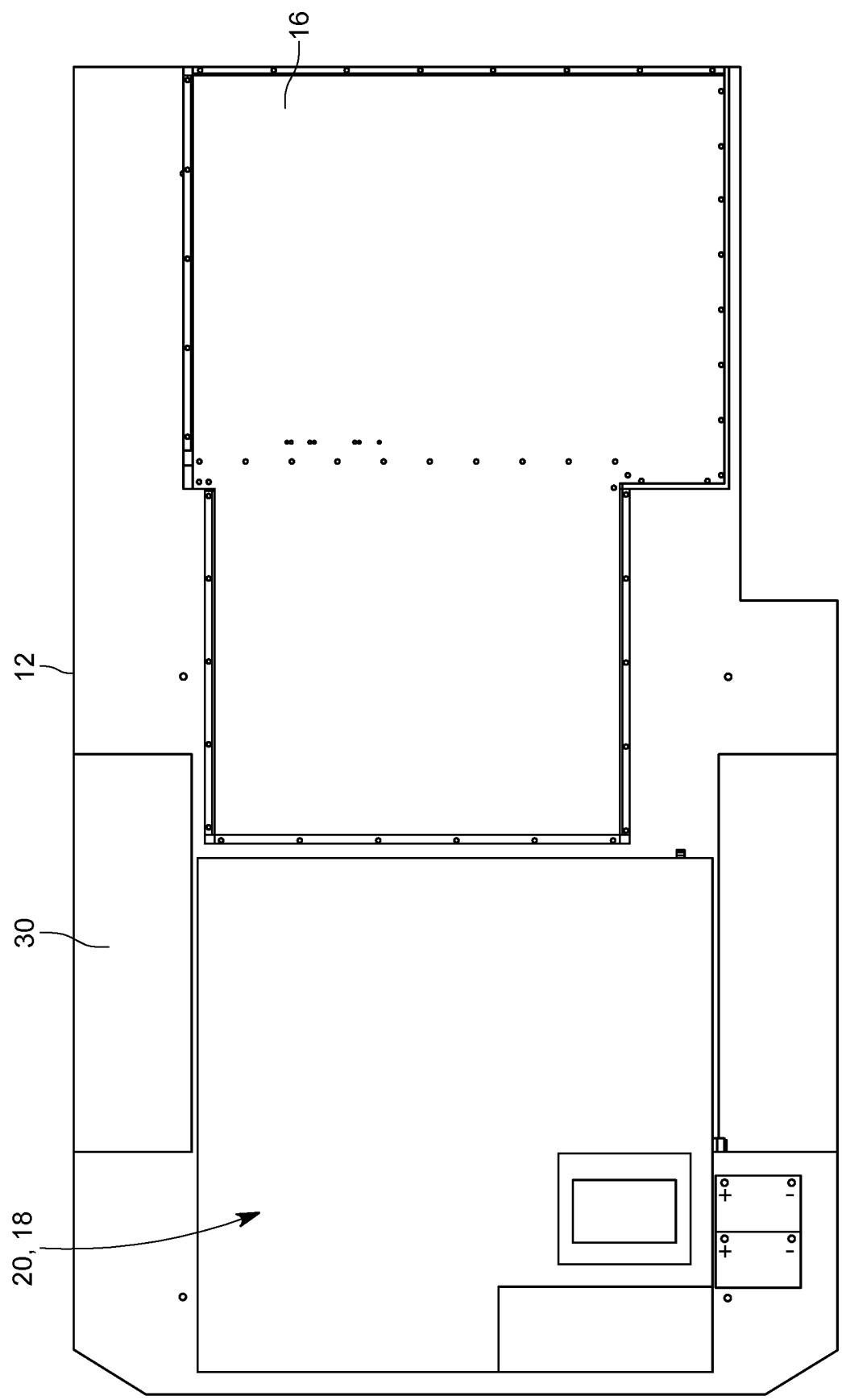
FIG. 2 is a schematic diagram of a top view of a rear floor area of a vehicle according to embodiments.
Figure 4:
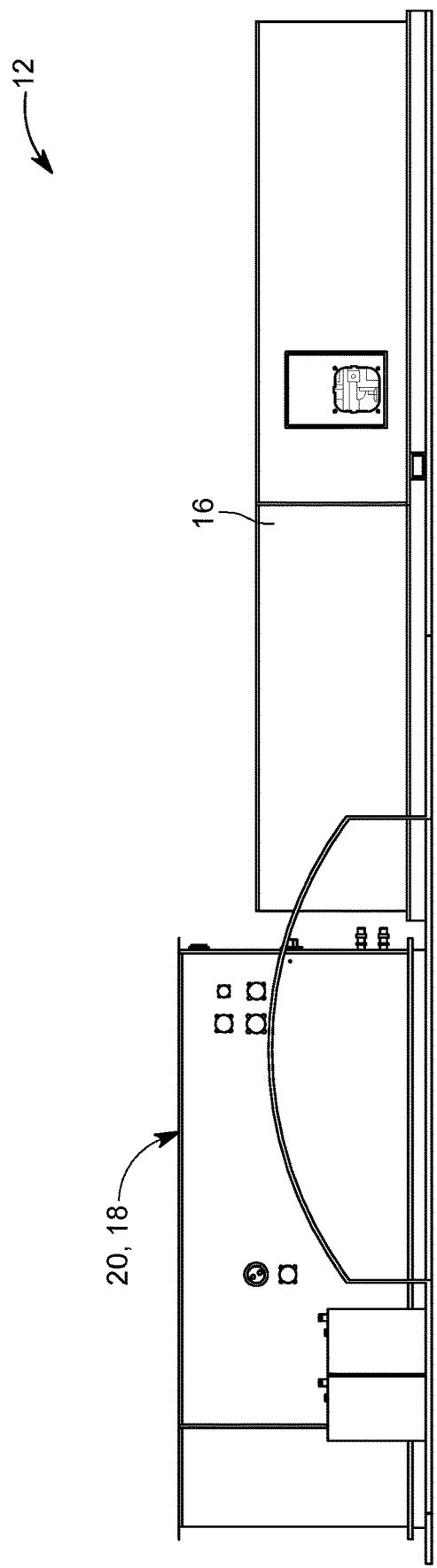
FIG. 4 is a schematic diagram of a side view of the electric vehicle charging system according to embodiments.

FIGS. 2-4 illustrate the electric vehicle charging system 14 in the vehicle 12, according to one embodiment. In certain embodiments, the battery 16 can be located between the front and rear wheels of the vehicle (note rear wheels 30 shown), such as at or near the center of the vehicle chassis. In the illustrated embodiment, the high voltage DC-DC converters/inverters 20, along with the BMS 18 can be located at least partially over the rear wheels 30 at the rear of the vehicle chassis. In certain embodiments, the system can also comprise a low voltage system (e.g., 12 V and/or 24 V battery system) for charging, for example, consumer electronics. The low voltage system can receive power from the battery 16, or from a separate battery (e.g., a lead-acid battery).

Figure 5:
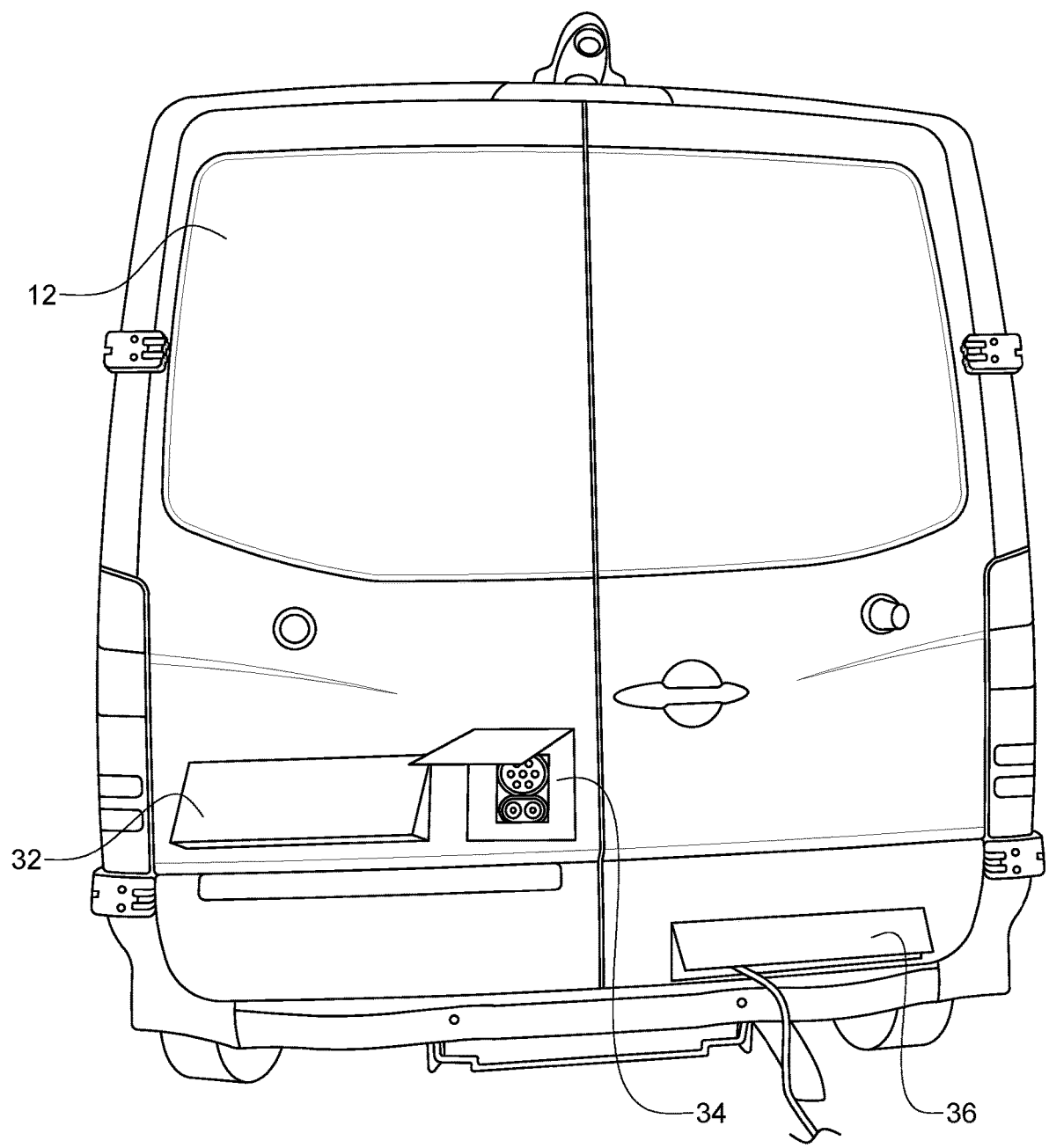
FIG. 5 is a schematic diagram of the rear of a vehicle with an electric vehicle charging system according to embodiments.

FIG. 5 illustrates rear doors of the vehicle 12. In certain embodiments, the vehicle 12 can comprise an opening 32 configured as a vent for the DC-DC converters/inverters 20, an opening or port 34 for an electrical connector (e.g., a J1772CCS Type 1 or other connector) for charging the battery 16, and/or an opening 36 through which the electrical connector and cord for charging the electrical vehicle can be accessed and extended from out of the vehicle 12.

Figure 6:
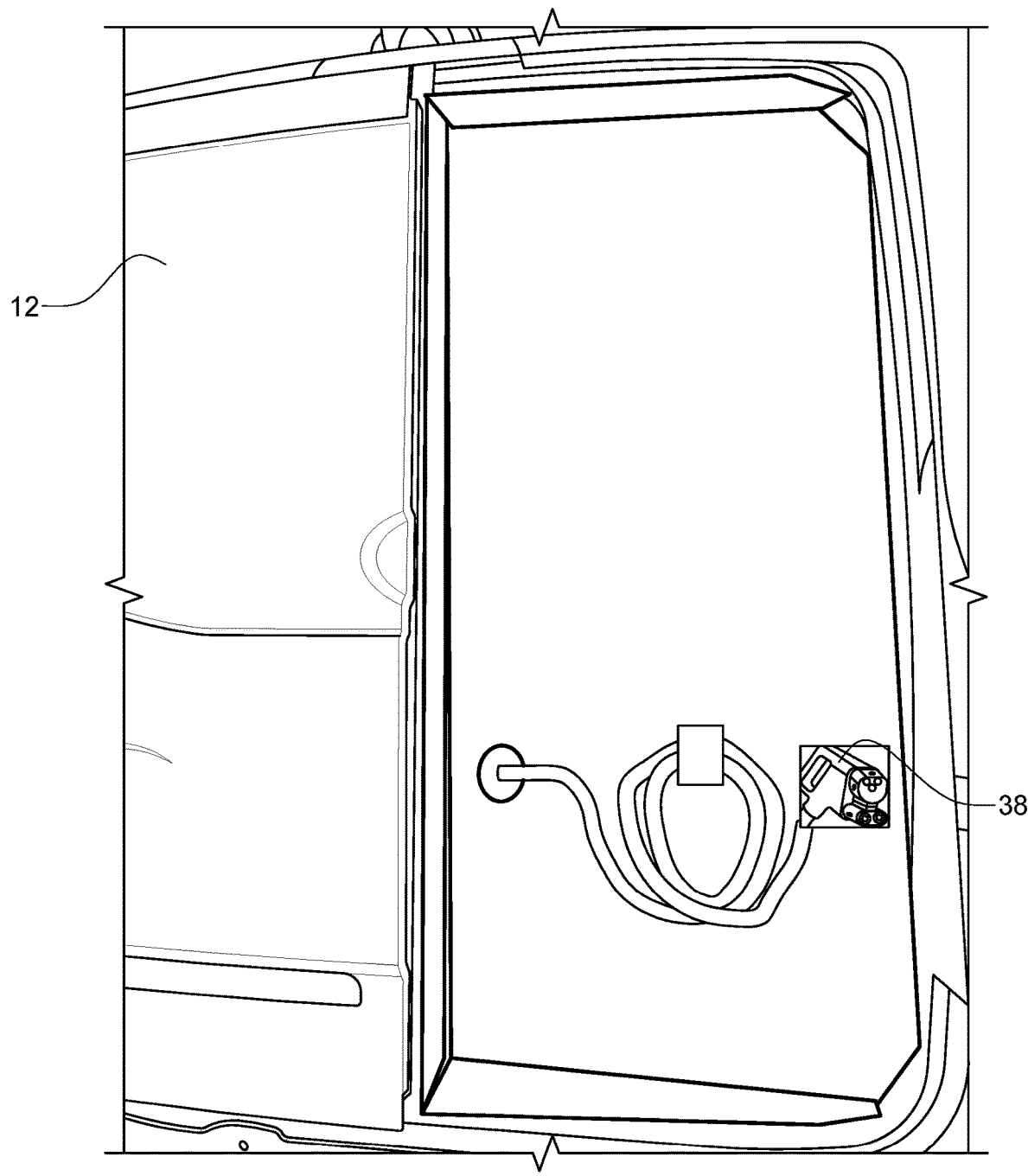
FIG. 6 is a schematic diagram of the rear of a vehicle with an electric vehicle charging system with a view inside one of the rear doors according to embodiments.

Referring to FIG. 6, in certain embodiments one or both rear doors of the vehicle 12 can comprise a recessed or "false" wall to provide a mounting surface for various components, such as the electrical connector and cable shown 38 for charging a vehicle. In one non-limiting embodiment, the electrical connector and cable 38 can include a J1772 CCS Type 1 charge handle attached to a twenty-five foot cord.

FIG. 7 illustrates one example location of a heat exchanger 40 (which includes a vent coupling the heat exchanger 40 to the environment outside of the vehicle) for the thermal management system 22. The heat exchanger 40 can operate in a manner similar to a vehicle radiator in which a refrigerant is cycled between the heat exchanger 40 and the conduits on the battery 16, BMS 18, and the DC-DC converters/inverters 20. The heat exchanger can also include a fan that blows ambient air on the conduits of the heat exchanger to improve the amount of heat that is expelled into the environment outside of the vehicle. In embodiments in which the vehicle 12 comprises a van with a sliding side cargo door, the vent of heat exchanger 40 can be located in a recess in the wall of the vehicle and configured such that the door can be opened and cover the vent without blocking the door. The vent of heat exchanger 40 can also be located at any other location on the body or chassis of the vehicle. The dashed lines 41A and 41B illustrate the conduits (arranged on an interior wall or inside an interior wall of the vehicle) passing from the of heat exchanger 40 to the conduits described above in connection with FIGS. 3B and 3C. In the case of the two separate conduit arrangement illustrated in FIG. 3B, the refrigerant can be passed through conduits 41A and 41B and the conduits are split close to the battery 16, BMS 18, and the DC-DC converters/inverters 20. Alternatively, separate conduits for the two separate conduit arrangements in FIG. 3B can be provided from the heat exchanger 40, which would result in four conduits coupled to the cooler, heat exchanger 40, two conduits for each of the two separate conduit arrangements illustrated in FIG. 3B.

Figure 8A:
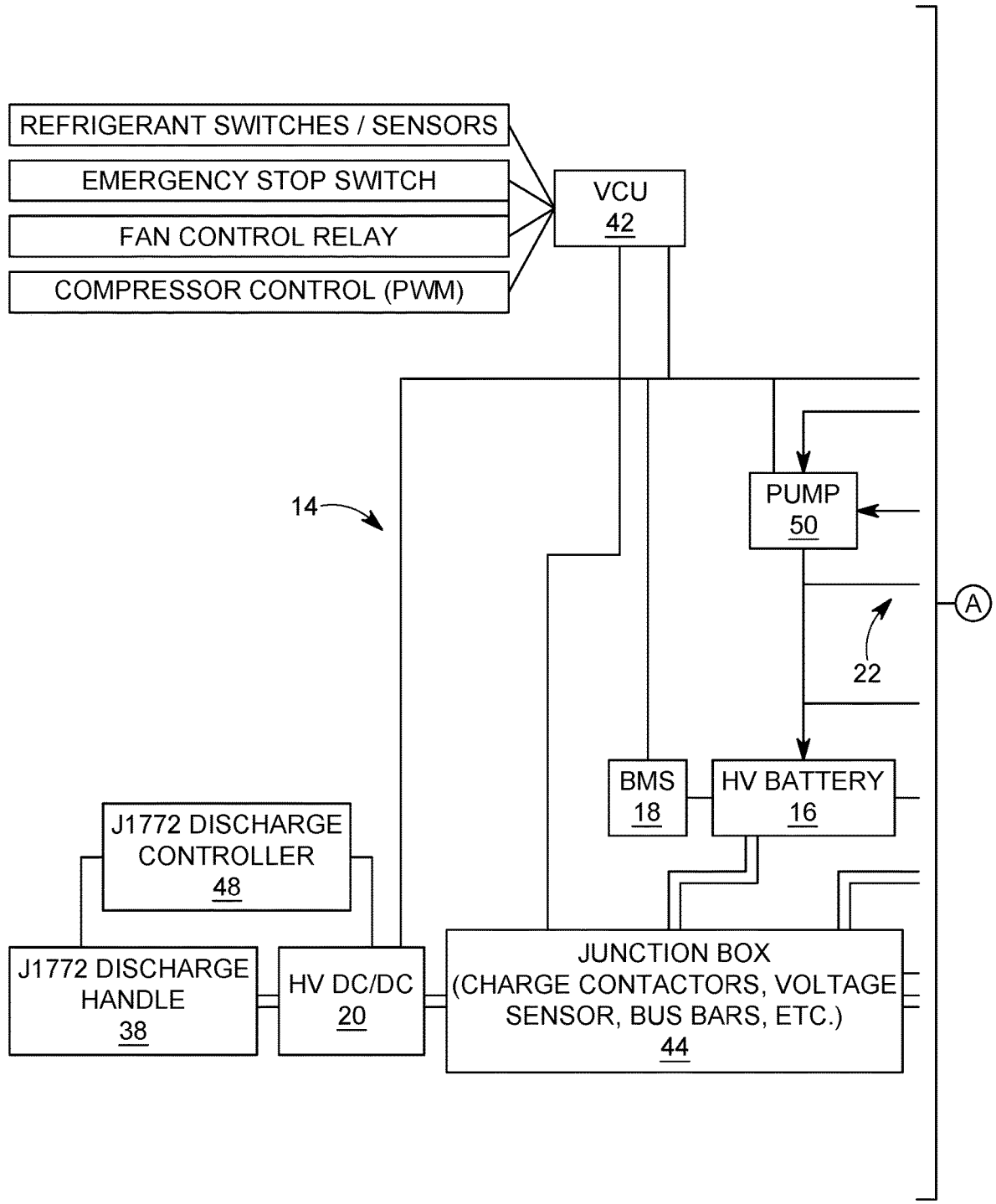
FIGS. 8A and 8B are a schematic block diagram illustrating a control system for an electric vehicle charging system, according to embodiments.
Figure 8B:
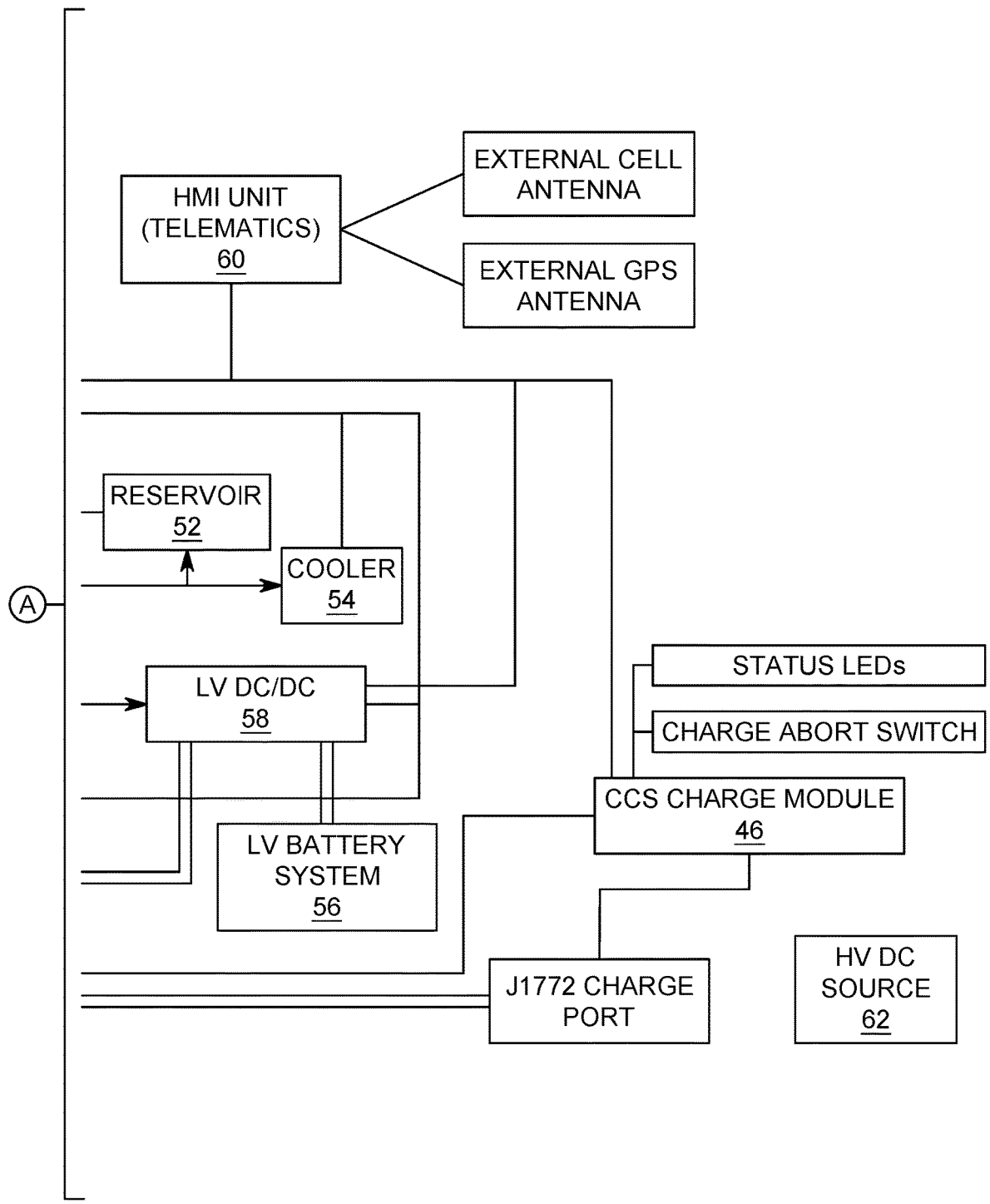

FIGS. 8A and 8B are a schematic block diagram illustrating a representative embodiment of the various components of the electrical vehicle charging system 14, and the various connections between the devices for electrical power, data, control signals, refrigerant, etc. The system 14 may comprise a supervisory or system control unit 42 (also referred to as a vehicle control unit or VCU)s. The system control unit 42 can be in communication with the other components of the system directly, or via a junction box 44. For example, the system control unit 42 can be in communication with the BMS 18, a combined charging system (CCS) module 46, as well as refrigerant switches and sensors, an emergency stop switch, fan control relays, and a compressor control unit for the thermal management system.

The battery 16 can be coupled to the DC-DC converters/inverters 20 via the junction box 44. A discharge control unit 48 can be in communication with the DC-DC converters/inverters 20 and with the electrical discharge connector 38.

Still referring to FIGS. 8A and 8B, the thermal management system 22 includes the conduits and the heat exchanger 40. The heat exchanger 40 can comprise a pump 50 and a refrigerant reservoir 52, and a compressor 54. Operation of the thermal management system 22 can be controlled by the supervisory control unit 42 in response to data of, for example, the temperature, discharge rate, etc., of the battery 16. In certain embodiments, refrigerant can be conducted around or through the battery modules 28 by conduits arranged in and/or around the modules.

In certain embodiments, the system 14 can comprise a low voltage battery system comprising a battery 56, and at least one DC-DC converter/inverter 58. The battery 56 can be configured to deliver electrical power at a voltage of, for example, 12V, 24V, etc.

The system 14 can also comprise a human machine interface (HMI) 60, which can optionally comprise a display, and which can be in communication with a cellular antenna, a GPS antenna, or the like to relay and receive data (e.g., to an online platform) regarding various system performance metrics such as charging rate, power received and/or delivered, the state of charge of an electric vehicle battery being charged by the system, state of charge of the battery 16, etc.

In use, the vehicle 12 can travel to the location of an electric vehicle in need of charging. The discharge handle 38 can be coupled to the electric vehicle, and the discharge controller 48 can determine data of the electric vehicle's battery (e.g., type, voltage, capacity, remaining charge, etc.), charging requirements (e.g., input voltage and current parameters, etc.), and/or other information, and can relay the information to the system control unit 42. In certain embodiments, the discharge controller 48 can determine a charging voltage (e.g., a "second voltage") of the electric vehicle, and can provide the charging voltage to the system control unit 42. The system control unit 42 can then transmit control signals to the BMS 18 to begin discharging the battery 16 to provide direct current at the voltage of the battery 16 to the DC-DC converters/inverters 20. The system control unit 42 can further transmit control signals to the DC-DC converters/inverters 20 to step up or step down the voltage of the direct current received from the battery 16 to correspond to the charging voltage of the electric vehicle. Direct current at the electric vehicle's charging voltage can then be supplied to the electric vehicle via the electrical connector 38 to charge the electric vehicle's battery. The system control unit 42 can coordinate discharging of the battery 16 using the BMS 18, charging of the electric vehicle, cooling of the system 14 by the thermal management system, etc.

In certain embodiments, the battery 16 can be recharged by a high voltage DC power source 62, such as at a fleet home location, enabling fast recharging of the mobile system and reducing losses associated with conversion from AC to DC.

The systems described herein can provide significant advantages over known mobile electric vehicle charging systems. For example, the systems described herein can provide high voltage, Level 3 direct current charging of electric vehicles at a voltage of 200 V to 480 V or more, and can deliver 50 kW of power or more. By using high voltage DC-DC converters/inverters, the current supplied by the battery 16 need not be converted to alternating current, and the electric vehicle's system need not convert the alternating current back to direct current, resulting in significant energy savings of 30% or more as compared to existing mobile AC charging systems. The thermal management system allows increased power delivery over short time periods by maintaining the battery 16, the BMS 18, and the DC-DC converters/inverters 20 within a specified operating temperature range. Those skilled in the art will recognize that the particular temperature range for the specified operating temperature range will depend upon the operating characteristics of the battery 16, the BMS 18, and the DC-DC converters/inverters 20, and that manufacturers of these components typically provide preferred temperature ranges for each of the components.

Example 1: High Voltage DC-DC Charging System

The following example describes an exemplary embodiment of a DC-DC charging system capable of accepting 65 KW DC charge and discharging (off-charging) into an electric vehicle (EV) at 50 KW DC rate. Operating conditions may include a temperature range of 0 to 40 Celsius. The system can be mounted inside a van, but may be implemented in any setting mobile or stationary. The system can charge EVs with a voltage range of 200V to 600V, such as 260V to 410V, depending on the battery configuration. Off-charging can be compatible for EVs with J1772 CCS type 1 DC fast charge ports, or other charging ports.

In certain embodiments the system charging voltage can be 600V. The system off-charging voltage (e.g., when charging an electric vehicle) can be 260V-410V, depending on the particular vehicle.

The charging functionality of the system in the van can work with the following specifications. The system can be equipped with a J1772 CCS type 1 port, which is capable of accepting DC fast charge from a DC fast charger (e.g., an off-board DC fast charger capable of providing 600 V charge voltage). The CCS charge module communicates with the DC fast charger and establishes communication with the charging source. The battery management system (BMS) provides the charge voltage and current limits based on the battery state of charge (SOC) and temperature. The off-board charger complies with the requested information and charging starts. Battery charge voltage and current limits are updated based on the battery SOC and temperature and communicated to the charger as the charging progresses. The thermal management system 22 is automatically turned on if needed. Once the charging is complete, a message appears on the HMI display unit in the van's cab informing the operator. Total energy delivered during the charge event can be logged and displayed on the HMI display unit. The information can also be accessible via a web portal application for a dispatch center to view and download. In addition, both the low voltage (LV) DC-DC and the 24V-12V DC-DC systems are in place to provide power to electronics with 24V and 12V input requirements, respectively.

The off-charging or discharging functionality for charging an electric vehicle can operate as follows. The system can be equipped with J1772 CCS type 1 DC fast charge handle capable of delivering charge (off-charging) to an EV which has a compatible J1772 CCS type 1 port. The off-charging voltage limit in this example is 410V and the DC fast off-charge rate is 50 KW, but other voltages and discharge rates are possible. Off-charging involves the high voltage DC-DC converters/inverters 20 providing a DC voltage that is adjusted based on the DC voltage provided by the battery 16. The high voltage (HV) DC-DC converters/inverters take the system battery voltage as input and outputs a voltage in the range of 260V to 410V DC. The output voltage and power rate are determined through communication with the recipient EVs charging system. Rate of off-charging depends on the system temperature and the state of charge of the battery (both recipient (EV) and the donor (system in van) batteries). The HMI unit displays the energy being delivered to an EV in real time. Total energy delivered during an off-charging event is logged and available in the web portal. In addition, both the LV DC-DC and the 24V-12V DC-DC systems are in place is to provide power to electronics (non-high voltage system components) with 24V and 12V input requirements, respectively.

The system can comprise a HV lithium ion battery pack with battery management system. The battery stores the electrical energy and is capable of accepting charge and delivering charge (discharging). The battery is equipped with a battery management system which monitors the battery health and communicates safe charge/discharge voltage and current limits with the system control unit. The battery management system also controls the battery contactors. The batteries can be liquid or air cooled.

The system can comprise a J1772 CCS type 1 charge port which enables an external DC charger to charge the HV battery. This can be controlled by the CCS charge module that controls when the system will accept a charge.

The high voltage DC-DC converter/inverter device(s) accepts the battery DC voltage as input and outputs a DC voltage which is compatible with an EV which is being charged. In certain embodiments, this device can work in "buck" mode in which it ramps down the battery voltage. In certain embodiments, the DC-DC converter/inverter device (s) can be buck-boost converters configured to output a voltage that is greater or less than the input voltage. The HV DC-DC converter/inverter device(s) can be rated at 50 KW, or at any other value.

The J1772 off-charging handle with cord enable an EV to be charged quickly using high voltage DC. This can be controlled by a J1772 discharge controller that communicates with the EV during a charge event. The EV can have a compatible charging port.

The system can comprise a Vehicle Control Unit (VCU) (also referred to as the system control unit), which can be configured as a supervisory controller to coordinates system functions. It can communicate with the BMS, HMI, HV DC-DC converter/inverter, LV DC-DC, and CCS charge controllers via, for example, a CAN (controller area network) to coordinate system states, e.g. charge, off-charge, turn off and activate the thermal management system 22, etc. It can collect diagnostic information from the other modules and passes this to the HMI to aid troubleshooting. It can also control charging of the LV 24V battery system.

The system can also comprise a human machine interface (HMI) display, which can be a touch screen display enabling the user to monitor the system performance and take action as necessary. Charging or off-charging can be enabled or stopped any time using this interface, or set to either a time or delivered kW limit. The HMI unit also displays in real time the amount of charge being accepted or delivered and the total amount of energy accepted or delivered for an event. It receives and is capable of displaying system faults to the operator.

The system can also comprise a low voltage battery system comprising a HV to LV DC-DC converter/inverter, 24V and/or 12V DC-DC converter/inverter, and 24V batteries. Both the LV DC-DC converter/inverter and the 24V to 12V DC-DC converter/inverter can provide power to electronics with 24V and 12V input requirements, respectively. The LV batteries can be lead acid batteries. In some embodiments, the charging output set point of the LV DC-DC converter/inverter can be controlled by the VCU system control unit.

The system also includes a thermal management system 22. The thermal management system 22 comprises a reservoir to hold refrigerant, a pump to move the refrigerant through the conduit, and a heat exchanger 40. The system can maintain the battery cell temperature within a selected operating range and control the temperature within the BMS 18, HV DC-DC inverters/converters 20, and/or the LV DC-DC converter/inverter. The operation of thermal management system operation can be controlled by the VCU system control unit. The management system circulates refrigerant through the battery 16, the BMS 18, the HV DC-DC inverters/converters 20, and/or the LV DC-DC system during the charging and off-charging events. In certain embodiments, the thermal management system 22 can also circulate refrigerant (e.g., liquid refrigerant) through the discharge handle 38 (e.g., through a conduit circuit extending in or on the cable to the discharge handle and back).

The system can also comprise a GPS system enabling the vehicle location to be monitored. A cellular antenna up-loads the location and charge/off-charge information to a web-based server. This information can be viewed remotely (e.g., by a user with log-in credentials).

Example 2: Example Computing Environment

Figure 9:
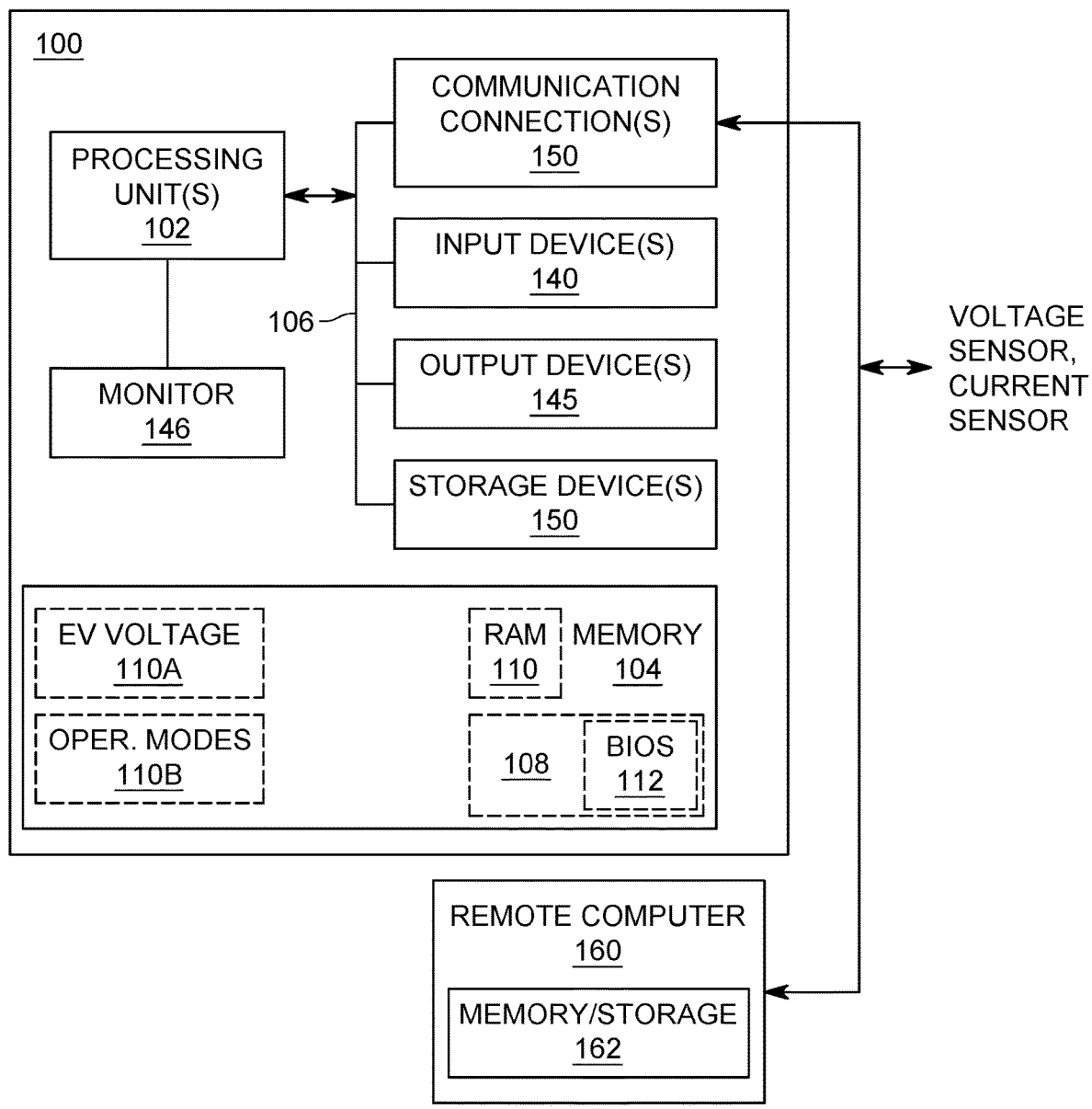
FIG. 9 is a schematic block diagram illustrating a representative computing environment for implementing the disclosed technologies, according to embodiments.

FIG. 9 and the following discussion are intended to provide a brief, general description of an exemplary computing environment in which the disclosed control system technology may be implemented. For example, the methods and processes described herein can be carried out by a controller or processor configured similarly to the computing environment described below. Moreover, the disclosed technology may be implemented with other computer system configurations, including hand held devices, digital signal processors (DSPs), multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network.

With reference to FIG. 9, an exemplary system for implementing the disclosed technology includes a general-purpose controller in the form of an exemplary conventional PC 100, including one or more processing units 102, a system memory 104, and a system bus 106 that couples various system components including the system memory 104 to the one or more processing units 102. The system bus 106 may be any of several types of bus structures including a memory bus or memory controller, a peripheral bus, and a local bus using any of a variety of bus architectures. The exemplary system memory 104 includes read only memory (ROM) 108 and random-access memory (RAM) 110. A basic input/output system (BIOS) 112, containing the basic routines that help with the transfer of information between elements within the PC 100, is stored in ROM 108. In the example of FIG. 9, data and processor-executable instructions for determining the charging voltage of the electric vehicle, controlling the current output and voltage of the battery, controlling the voltage output of the DC-DC converter, etc., are stored in a memory 110A, and data and processor-executable instructions for operational modes (e.g., charging and discharging modes) of the system are stored in memory 110B.

The exemplary PC 100 further includes one or more storage devices 130 such as a hard disk drive for reading from and writing to a hard disk, a magnetic disk drive for reading from or writing to a removable magnetic disk, and an optical disk drive. Such storage devices can be connected to the system bus 106 by a hard disk drive interface, a magnetic disk drive interface, and an optical drive interface, respectively. The drives and their associated computer readable media provide nonvolatile storage of computer-readable instructions, data structures, program modules, and other data for the PC 100. Other types of computer-readable media which can store data that is accessible by a PC, such as magnetic cassettes, flash memory cards, digital video disks.

A number of program modules may be stored in the storage devices 130 including an operating system, one or more application programs, other program modules, and program data. A user may enter commands and information into the PC 100 through one or more input devices 140 such as a keyboard and a pointing device such as a mouse. A monitor 146 or other type of display device is also connected to the system bus 106 via an interface, such as a video adapter. Outputs such as commands, current and/or voltage values, etc., can be transmitted via one or more output devices 145.

The PC 100 may operate in a networked environment using logical connections to one or more remote computers, such as a remote computer 160 including a memory 162. In some examples, one or more network or communication connections 150 are included. The remote computer 160 may be another PC, a server, a router, a network PC, or a peer device or other common network node, and typically includes many or all of the elements described above relative to the PC 100, although only a memory storage device 162 has been illustrated in FIG. 9. The personal computer 100 and/or the remote computer 160 can be connected to a logical a local area network (LAN) and a wide area network (WAN). In certain embodiments, the remote computer 160 can comprise a virtual processor implemented in a remote server environment or cloud computing environment.

The control systems described herein can be configured as proportional-integral-derivative (PID) control systems, microcontrollers, digital signal processing (DSP) control systems (e.g., dedicated real-time DSP control systems), and the like.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims. We therefore claim all that comes within the scope and spirit of these claims.

The invention claimed is:

1. A vehicle, comprising:
   a battery comprising a plurality of battery cells, wherein the battery is configured to output a direct current at a first voltage;
   a direct current voltage converter configured to receive the direct current at the first voltage from the battery and convert the direct current at the first voltage to a direct current at a second voltage;
   an electrical connector in electrical communication with the direct current voltage converter, wherein the electrical connector is configured to supply the direct current at the second voltage from the direct current voltage converter to an electric vehicle;
   a control system configured to determine a charging voltage of the electric vehicle, and operate the direct current voltage converter so that the direct current at the second voltage corresponds to the charging voltage of the electric vehicle; and a thermal management system configured to maintain the battery within a selected temperature range; and a rear door having a recessed wall on which the electrical connector and a cable are mounted, wherein the cable is configured to supply the direct current at the second voltage to the electric vehicle.

2. The vehicle of claim 1, wherein the thermal management comprises:

a heat exchanger; and a conduit that is fluidically coupled to the heat exchanger and that is arranged on top of the battery.

3. The vehicle of claim 2, wherein the heat exchanger is arranged in a wall of the vehicle.

4. The vehicle of claim 3, wherein the heat exchanger further comprises a vent that is fluidically coupled with an environment outside of the vehicle.

5. The vehicle of claim 3, wherein the heat exchanger further comprises:

a refrigerant reservoir;

a compressor fluidically coupled to the refrigerant reservoir; and a pump fluidically coupled to the compressor and the conduit.

6. The vehicle of claim 2, wherein the conduit is also arranged on top of the direct current voltage converter.

7. The vehicle of claim 1, wherein the thermal management system comprises:

a heat exchanger; and a first conduit that is fluidically coupled to the heat exchanger and that is arranged on top of the battery; and a second conduit that is fluidically coupled to the heat exchanger and that is arranged on top of the direct current voltage converter.

8. The vehicle of claim 7, wherein the heat exchanger further comprises:

a refrigerant reservoir;

a compressor fluidically coupled to the refrigerant reservoir; and a pump fluidically coupled to the compressor and the first and second conduits.

9. The vehicle of claim 1, wherein the second voltage is 200V to 600V.

10. The vehicle of claim 1, wherein the vehicle comprises a car, truck, or van.

11. The vehicle of claim 1, wherein the control system comprises a discharge controller coupled to the electrical connector and configured to determine the charging voltage of the electric vehicle, and a system control unit configured to receive the charging voltage from the discharge controller and to transmit control signals to a battery management system to begin discharging the battery.

12. The vehicle of claim 11, wherein the system control unit is configured to transmit control signals to the direct current voltage converter to control the conversion of the direct current at the first voltage to direct current at the second voltage.

13. A method for charging an electric vehicle using a service vehicle, comprising:

coupling an electrical connector and a cable to the electric vehicle, wherein the electric connector and the cable are configured to be mounted in a rear door of the service vehicle, wherein the rear door has a recessed wall;

determining a charging voltage of the electric vehicle;

supplying, from a battery on the service vehicle, a direct current at a first voltage to a direct current voltage converter on the service vehicle;

converting, by the direct current voltage converter, the direct current at the first voltage to a direct current at a second voltage, wherein the second voltage corresponds to the determined charging voltage of the electric vehicle;

supplying, via the electrical connector and cable, the direct current at the second voltage to the electric vehicle from the service vehicle to charge the electric vehicle; and maintaining, by a thermal management system, the battery within a selected temperature range.

14. The method of claim 13, wherein the thermal management system includes a heat exchanger and a conduit that is fluidically coupled to the heat exchanger and that is arranged on top of the battery, and wherein the thermal management system maintains the battery within the selected temperature range by circulating refrigerant between the heat exchanger and the conduit arranged on top of the battery.

15. The method of claim 13, wherein the thermal management system further maintains the direct current voltage converter within another selected temperature range.

16. The method of claim 13, wherein the thermal management system includes a heat exchanger, a first conduit that is fluidically coupled to the heat exchanger and that is arranged on top of the battery, and a second conduit that is fluidically coupled to the heat exchanger and that is arranged on top of the direct current voltage converter, wherein the thermal management system maintains the direct current voltage converter and the battery within a selected temperature range.

17. The method of claim 13, further comprising recharging the battery on the service vehicle with a direct current power source.

18. The method of claim 13, wherein a discharge controller coupled to the electrical connector of the service vehicle determines the charging voltage of the electric vehicle, a system control unit of the service vehicle receives the charging voltage of the electric vehicle and transmits control signals to a battery management system to begin discharging the battery on the service vehicle.

19. The method of claim 18, wherein the system control unit transmits control signals to the direct current voltage converter to control the conversion of the direct current at the first voltage to the direct current at the second voltage.

20. The method of claim 18, wherein the system control unit controls the thermal management system to maintain the battery within the selected temperature range.

* * * * *